United States Patent [19]

Hanyu et al.

[11] Patent Number: 4,580,513
[45] Date of Patent: Apr. 8, 1986

[54] PATTERN SELECTING DEVICE FOR ELECTRONIC SEWING MACHINES

[75] Inventors: Susumu Hanyu; Hideaki Takenoya, both of Tokyo, Japan

[73] Assignee: Janome Sewing Machine Co., Ltd., Tokyo, Japan

[21] Appl. No.: 462,935

[22] Filed: Jan. 31, 1983

[30] Foreign Application Priority Data

Feb. 5, 1982 [JP] Japan ................... 57-16406

[51] Int. Cl.⁴ ............................................. D05B 3/02
[52] U.S. Cl. .................................... 112/445; 112/458; 40/491
[58] Field of Search ........... 112/158 F, 158 E, 158 R, 112/158 A, 158 B, 258; 40/491

[56] References Cited

U.S. PATENT DOCUMENTS

4,335,667  6/1982  Beckerman et al. ............ 112/158 F
4,343,248  8/1982  Hanyu et al. ................... 112/158 E
4,365,566 12/1982  Laidig .............................. 112/158 F

*Primary Examiner*—Peter P. Nerbun
*Attorney, Agent, or Firm*—Michael J. Striker

[57] ABSTRACT

A pattern selecting device for a sewing machine of the type having a housing, a panel mounted on the housing for indicating a number of pattern indicia to be selected by the sewing machine operator, and an electronic memory storing a number of stitch control data for producing the stitches in accordance to the pattern indicia. The panel is provided with a first portion carrying a first group of pattern indicia and a second portion for indicating a second group of pattern indicia and a third group of pattern indicia. The pattern selecting device includes two screening plates mounted on the second portion. Both plates are movable relative to the second and third groups of indicia in the second section to selectively hide one of the second and third groups of indicia and visualize the other of the second and third groups of indicia or to hide both the second and third groups of indicia. The device is further provided with a switching arrangement operated to move the screening plates relative to the second and third groups of indicia. The switching arrangement produces a first electric signal when the screening plates hide one of the second and third groups of indicia and visualize the other of the second and third groups of indicia, and produces a second electric signal when the screening plates hide both of the second and third groups of indicia.

4 Claims, 12 Drawing Figures

FIG_1

FIG_2

FIG_4

(4) Pattern selecting push button switches (7) Pattern group changeover switch (A) Upper shaft senser (B) Microcomputer (C) LED drive circuit

(D) Actuator drive circuit (LED₁)  Pattern indication
(LED₂)  Ten-key indication
(10) 7-segment indication

(E) Needle control pulse motor

(F) Feed control pulse motor

FIG_5

(1) Start
(2) Reading of Key
(3) Slide switch designating first group of indicia
(4) Lighting of LED₂
(5) 7-segment indication
(6) Slide switch designating second group indicia
(7) Selection of first and second pattern indicia
(8) Selection of first and third group
(9) Lighting of LED₁
(10) Selection of first group indicia

PATTERN SELECTING DEVICE FOR ELECTRONIC SEWING MACHINES

BACKGROUND OF THE INVENTION

The invention relates to a pattern selecting device for electronic sewing machines, and more particularly to a pattern selecting device for such a sewing machine in which patterns to be stitched by the sewing machine are divided into groups in dependence upon the types thereof and the frequencies in that the patterns may be preferably selected and used by the sewing machine operator. Some of the pattern groups are selectively hidden or made visualized by operation of a changeover switch for the convenience of the sewing machine operator when selecting the patterns, so that only the visualized patterns may be selected by the same pattern selecting switches.

Generally an electronic sewing machine is incorporated with an electronic memory which is small sized, but may store a great number of patterns to be stitched. It is therefore necessary to show all the pattern indicia on the sewing machine together with the corresponding number of pattern selecting switches, so that the sewing machine operator may selectively produce any of the patterns. Under such circumstances, it would be very difficult and troublesome for the sewing machine operator to discriminate and find out a desired pattern from so many patterns. Moreover, the limited space of the panel is all covered with the pattern indicia and the accompanied pattern selecting switches. As the result, the sewing machine would be considerably deteriorated with respect to the pattern selecting operation as well as the outer appearance of the sewing machine.

SUMMARY OF THE INVENTION

The invention has been provided to eliminate the foregoing defects and disadvantages of the prior art. According to the invention, a large number of patterns are divided into a predetermined number of groups in dependence upon the types and frequencies in that the patterns are preferably selected and used by the sewing machine operator. A group of patterns with may be most frequently used is usually visualized on the panel of the sewing machine so that any of such patterns may be easily selected by operation of a minimum number of pattern selecting switches. The other groups of patterns which may be of comparatively lower frequency of selection by the sewing machine operator are selectively visualized on the panel by operation of a pattern changeover switch so that any of such patterns may be easily selected by operation of the same pattern selecting switches, which are then bearing a ten-key function so that the pattern selecting switches may be adapted to select all the visualized patterns on the panel including the group of most frequently selected patterns, which is usually visualized on the panel.

It is therefore a primary object of the invention to provide a sewing machine which is capable of producing a large number of stitch patterns by selective operation of a minimum number of pattern selecting switches which may be functionally varied in dependence upon the indication mode of selectable patterns.

It is another object of the invention to maintain a simplest possible outer appearance of the sewing machine so that the sewing machine operator may easily discern the patterns arranged on the panel when selecting any of the patterns.

The other features and advantages of the invention will be apparent from the following description of preferred embodiments in reference to the attached drawings.

BRIEF DESCRIPTION OF THE DRAWINGS

FIGS. 3(A) to 3-(C) are explanatory operational views of the pattern selecting device;

DETAILED DESCRIPTION OF THE PREFERRED EMBODIMENTS

Figure 1:
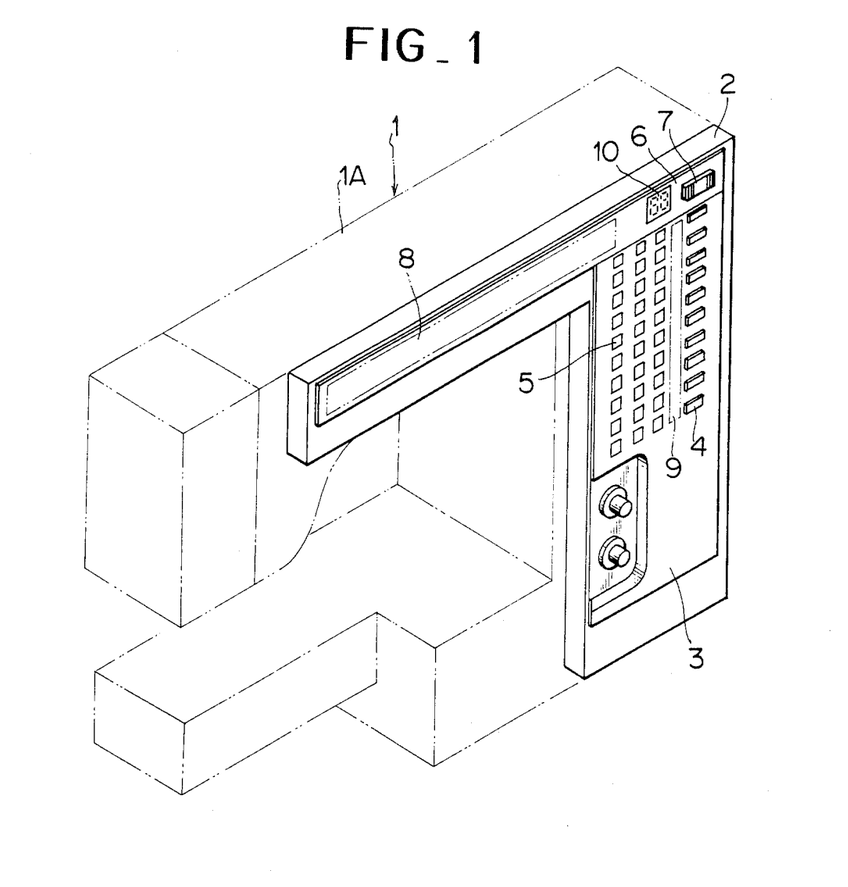
FIG. 1 is a perspective view of a sewing machine according to the invention.

The invention will be described in reference to the preferred embodiments as shown in the attached drawings. In FIG. 1, a sewing machine 1 has a machine housing 1A. The machine housing 1A has a panel 2 secured to the front face thereof. The panel 2 has a first vertical portion 3 and a second lateral portion 6 in accordance with the configuration of the machine housing 1A. On the first portion 3 of panel 2, there is vertically arranged a group of pattern selecting push button switches 4 each having a ten-key function meaning numbers 0–9 respectively designated to the switches from the top to the bottom. Adjacent the group of pattern selecting push button switches 4, is arranged a first group of pattern indicia 5 in three rows which may be most frequently produced by the sewing machine 1 at the selection of the sewing machine operator.

The second portion 6 of panel 2 has a slide switch 7 provided thereon, which is slidingly shifted to three predetermined positions to selectively show pattern indicia on a pattern indicating part 8. For example, when the switch 7 is at the middle position, the pattern indicia on the pattern indicating part 8 are all covered and become invisible. In this case, the push button switches 4 become effective to be operated to select any of the pattern indicia 5. More precisely, each time one push button switch 4 is operated, the corresponding laterally arranged three indicia 5 are selected one by one from the left to right repeatedly, and the selected indicium is electrically lighted. When the switch 7 is at the left side position, a second group of pattern indicia on the pattern indicating part 8, for example, the capital alphabet letters become visible. Then any of pattern indicia 5 in the first and second groups of pattern indicia may be selected by ten-key operation of the pattern selecting push button switch 4 in reference to the numbers respectively given to the pattern indicia 5 in the first group and to the pattern indicia in the second group.

In this case, the ten-key numbers 0-9 are indicated with electric light in a number indicating part 9 on the panel 2 between the group of pattern selecting push button switches 4 and the first group of pattern indicia 5. The result of the ten-key operation of the pattern selecting push button switches 4 is indicated in a 2—figure number at a 7—segment number indication tubes 10 in the panel 2. When the switch is at the right side position, the second group of pattern indicia on the pattern indicating part 8 is covered and becomes invisible. Instead, a third group of indicia, for example, the small alphabet letters become visible. Then any of pattern indicia in the first and third groups of pattern indicia may be selected in the same way as above mentioned when the second group of pattern indicia is visible.

Figure 2:
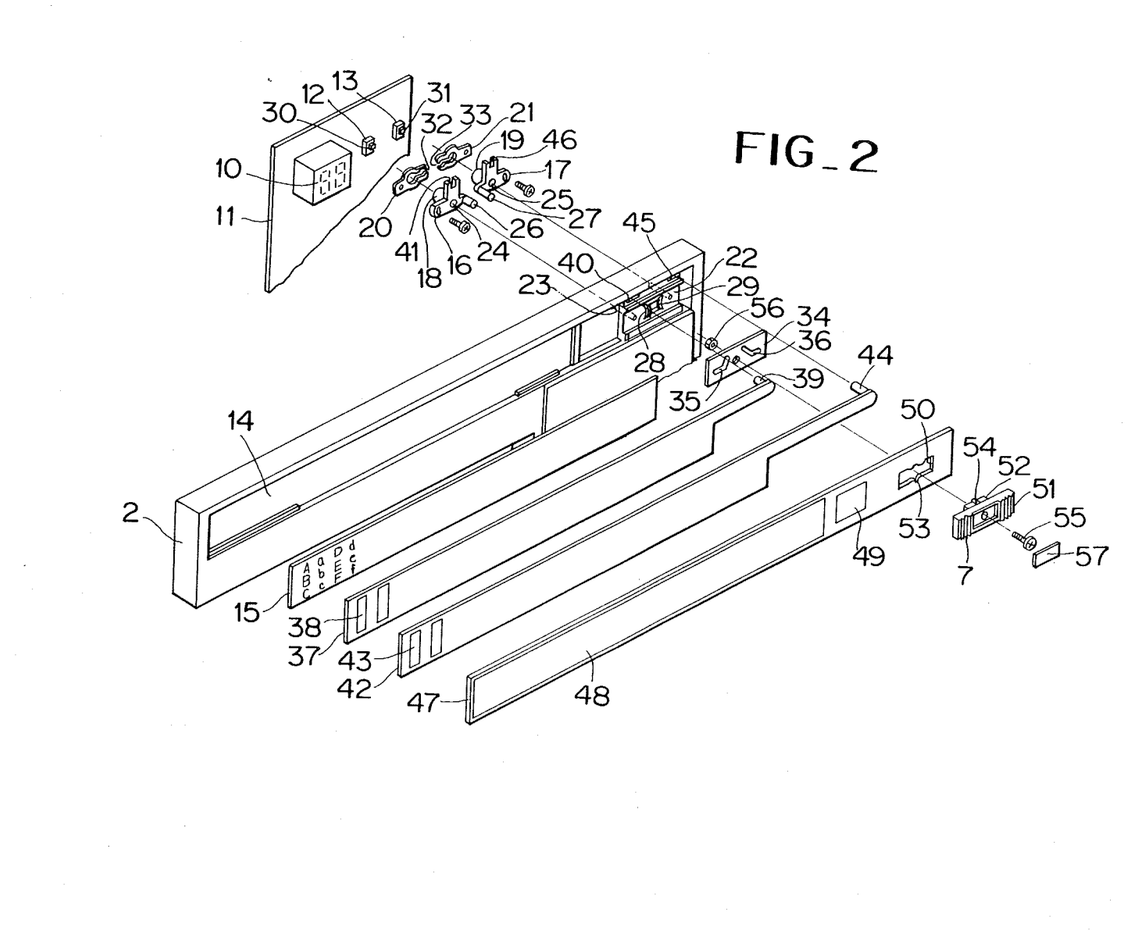
FIG. 2 is an exploded view of a pattern selecting device shown with partly omitted details, according to the invention.

In reference to FIG. 2 showing the panel 2 in an exploded view, a print board 11 is secured to the machine housing 1A behind panel 2. On one side of the print board 11, there are mounted the 7—segment number indication tubes 10, and switch elements 12, 13 each operated by the slide switch 7. On the other side of the print board 11, there are arranged the elements and the necessary wiring for controlling the pattern selection and pattern formation of the invention. The panel 2 is formed with a recessed part 14 on the front face thereof to which a pattern indicating plate 15 is fixedly attached. The pattern indicating plate 15 has pattern indicia such as the capital and small alphabet letters printed thereto alternately with an even space between the laterally adjacent letters as shown. These letters are each affixed with a specific 2-figure pattern number though it is not shown. A pair of adjusting elements 16, 17 are formed with bosses 18, 19, respectively. A pair of switch actuating elements 20, 21 are mounted on the bosses 18, 19, respectively, and then the adjusting elements 16, 17 and the switch actuating elements 20, 21 are fixedly connected to each other, respectively by means of fastening screws. The panel 2 is formed with another recess 22 in alignment with the pattern indicating recessed part 14. On the rear side of the recess 22, there are provided a pair of spaced transverse pins 23, 23 on which the adjusting elements 16, 17 are turnably mounted, respectively by way of holes 24, 25 thereof. In this condition, transverse projections 26, 27 of the adjusting elements 16, 17 are protruded out on the front side of the recess 22 through arcuated slots 28, 29 formed in the recess 22. The panel 2 is secured to the machine housing 1A of the sewing machine 1 by any suitable means as shown in FIG. 1. The switch elements 12, 13 are provided with actuators 30, 31, respectively, and the switch actuating elements 20, 21 are respectively formed with forked parts 32, 33 which engage the actuators 30, 31 of the switch actuating elements 12, 13. The recess 22 is so formed as to receive a cam plate 34 which is laterally slided in the recess 22. As shown, the cam plate 34 is formed with a pair of cam slots 35, 36 each consisting of a horizontal slot and an inclined slot which receive the transverse projections 26, 27 of the adjusting elements 16, 17, respectively.

A first slide plate 37 is slidably fitted to the recessed part 14 of the panel 2 to cover the pattern indicating plate 15 and is slidingly moved laterally of the recessed part 14. The first slide plate 37 is provided with a number of rectangular transparent parts 38 as partly shown in the drawing with a space between the adjacent transparent parts 38, the space being twice as wide as the space between the laterally adjacent indicia on the pattern indicating plate 15. The first slide plate 37 is opaque except the transparent rectangular parts 38. The slide plate 37 has a transverse projection 39 formed at the right end thereof. The transverse projection 39 passes through a laterally elongated slot 40 of the panel 2 and engages a fork 41 of the adjusting element 16. The slide plate 37 is so designed as to superpose the transparent parts 38 on the vertical rows of capital alphabet letters respectively when the plate 37 is slided to the left end position. Thus the capital alphabet letters are made visible. When the slide plate 37 is slided to the right end position, the plate 37 hides the capital alphabet letters and superpose the transparent parts 38 on the small alphabet letters so that the latter may be visible. A second slide plate 42 is also slidably fitted to the recessed part 14 of panel 2 and superposed on the first slide plate 37. The second slide plate 42 is provided with a number of transparent rectangular parts 43 as partly shown, and is substantially of the same design with the first slide plate 37. The second slide plate 42 has a transverse projection 44 formed at the right end thereof. The transverse projection 44 passes through a laterally elongated slot 45 of the panel 2 and engages a fork 46 of the adjusting element 17.

A window frame 47 is employed to fixedly cover the recessed part 14 of the panel 2 so that the slide plates 37, 42 may not come out of the recessed part 14 and so that the pattern indicia on the pattern indicating plate 15 may be visible through a transparent part 48 of the window frame 47. The window frame 47 has a laterally elongated opening 50 formed at the right end thereof. The opening 50 receives a boss 52 formed on the inner side of a switch knob 51 of the slide switch 7 in such a manner that the switch knob 51 may be laterally moved in the opening 50. The opening has notches 53 oppositly formed at the middle thereof which are to engage projections 54 formed on the boss 52 of the switch knob 51, to thereby determine the center position of the switch knob. The switch knob is fixedly connected to the cam plate 34 by means of a bolt 55 and a nut 56. The switch knob 51 has a cover 57 to be secured thereto on the outer side thereof to hide the bolt 55.

With the foregoing structure and combination of elements, the invention operates as follows: In reference to FIGS. 1 and 2 and FIG. 3(A), when the switch knob 51 is at the center position, the transverse projection 26 of adjusting element 16 is located at the right end of the horizontal part of cam slot 35, and the adjusting element 16 is slightly inclined in the clockwise direction. On the other hand, the transverse projection 27 is located at the left end of the horizontal part of cam slot 36, and the adjusting element 17 is slightly inclined in the counterclockwise direction.

Figure 3A:
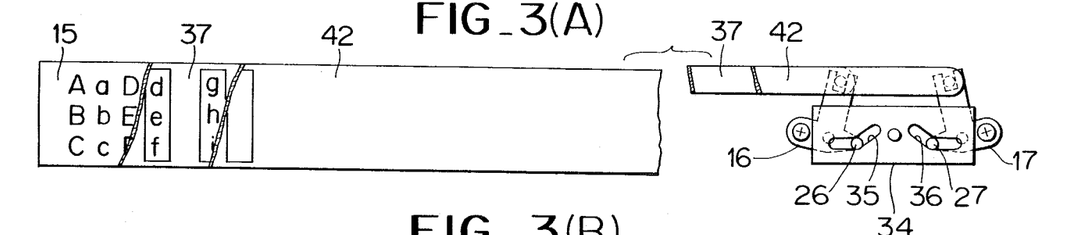

In this case, the first slide plate 37 is moved so that the transparent parts 38 may be aligned with the rows of the small alphabet letters on the pattern indicating plate 15, respectively and the second slide plate 42 is moved so that the transparent parts 43 may be aligned with the rows of the capital alphabet letters respectively. As the result, the capital alphabet letters are hidden by the first slide plate 37, and the small alphabet letters are hidden by the second slide plate 42. Therefore only the first group of indicies 5 may be selected by operation of the pattern selecting push button switches 4. Simultaneously the actuators 30, 31 of switch elements 12, 13 assume a lower position.

Figure 3B:
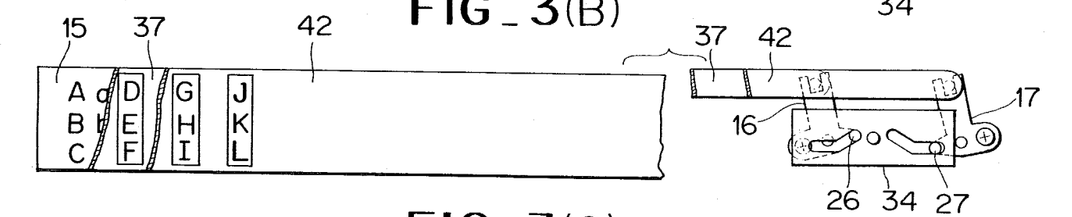

Further in reference to FIG. 3(B), when the switch knob 51 is at the left side position, the transverse projection 27 of adjusting element 17 is located at the left end of the horizontal part of cam slot 36, and the adjusting element 17 remains as it is in FIG. 3(A). The second slide plate 42 therefore hides the capital alphabet letters on the pattern indicating plate 15. On the other hand, the transverse projection 26 of adjusting element 16 is located at the upper end of the inclined part of cam slot 35, and the adjusting element 16 is turned in the counterclockwise direction as shown. In this case, the first slide plate 37 is moved so that the transparent parts 38 may be aligned with the rows of the capital alphabet letters respectively. As the result, the capital alphabet letters become visible. Simultaneously the actuator 30 of switch element 12, assumes an upper position.

Figure 3C:
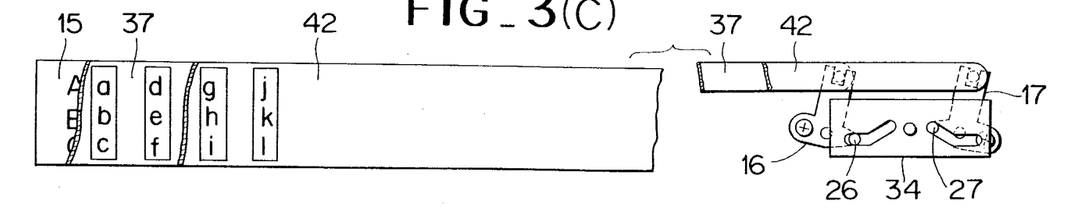

Further in reference to FIG. 3(C), when the switch knob 51 is at the right side position, the adjusting elements 16, 17 are inversely operated to assume the positions respectively as shown. As the result, the capital alphabet letters are hidden, and the small alphabet letters become visible. Simultaneously the actuator 30 of switch element 12 assumes a lower position and the actuator 31 of switch element 13 assumes an upper position.

Figure 4:
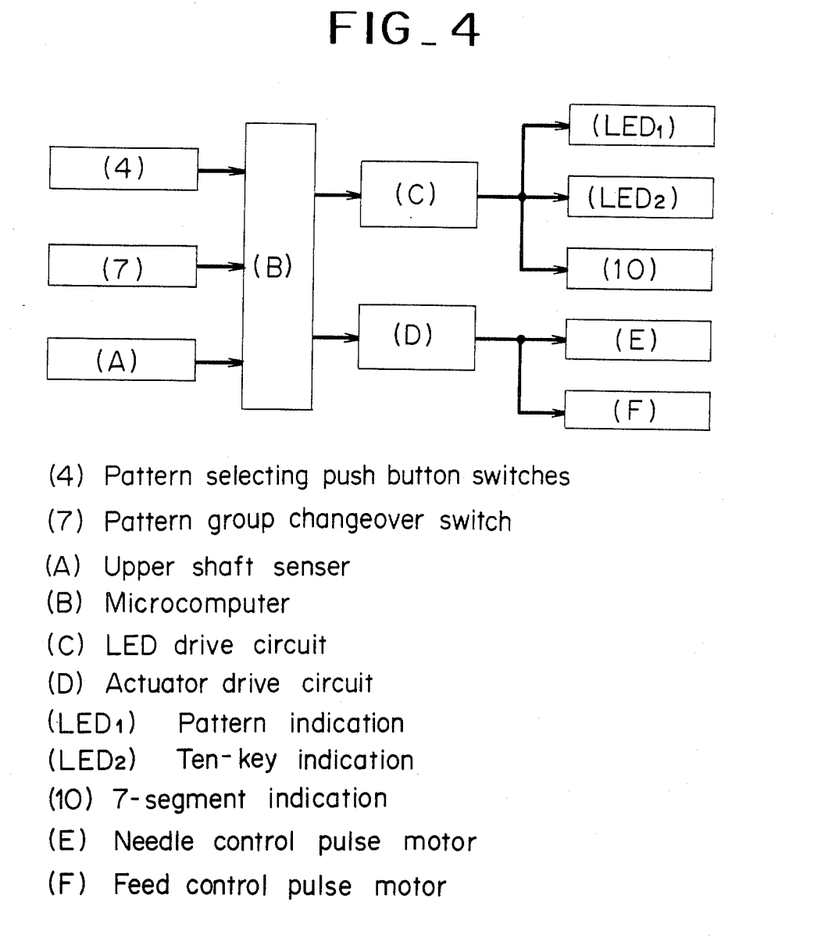
FIG. 4 is a block diagram of the control circuit of the invention.

In reference to FIG. 4 showing a block diagram of an electric control circuit, a microcomputer receives and processes the signals from the pattern selecting push button switches 4 and the slide switch 7, and then gives the output to a LED drive circuit as to the pattern selection. The LED drive circuit accordingly drives light emitting diodes (call $LED_1$ hereinafter) for lighting the first group of indicia 5, light emitting diodes (call $LED_2$ hereinafter) for lighting the ten-key numbers in the pattern number indicating part 9, and the 7—segment number indication tubes 10. In the meantime, the microcomputer receives a pulse signal of upper shaft sensor, which is produced per rotation of the upper drive shaft of sewing machine, so as to selectively give to an actuator drive circuit the stitch control signal of a selected pattern, and the actuator drive circuit drives pulse motors for controlling the lateral swinging amplitudes of needle and fabric feeding amount respectively.

Figure 5:
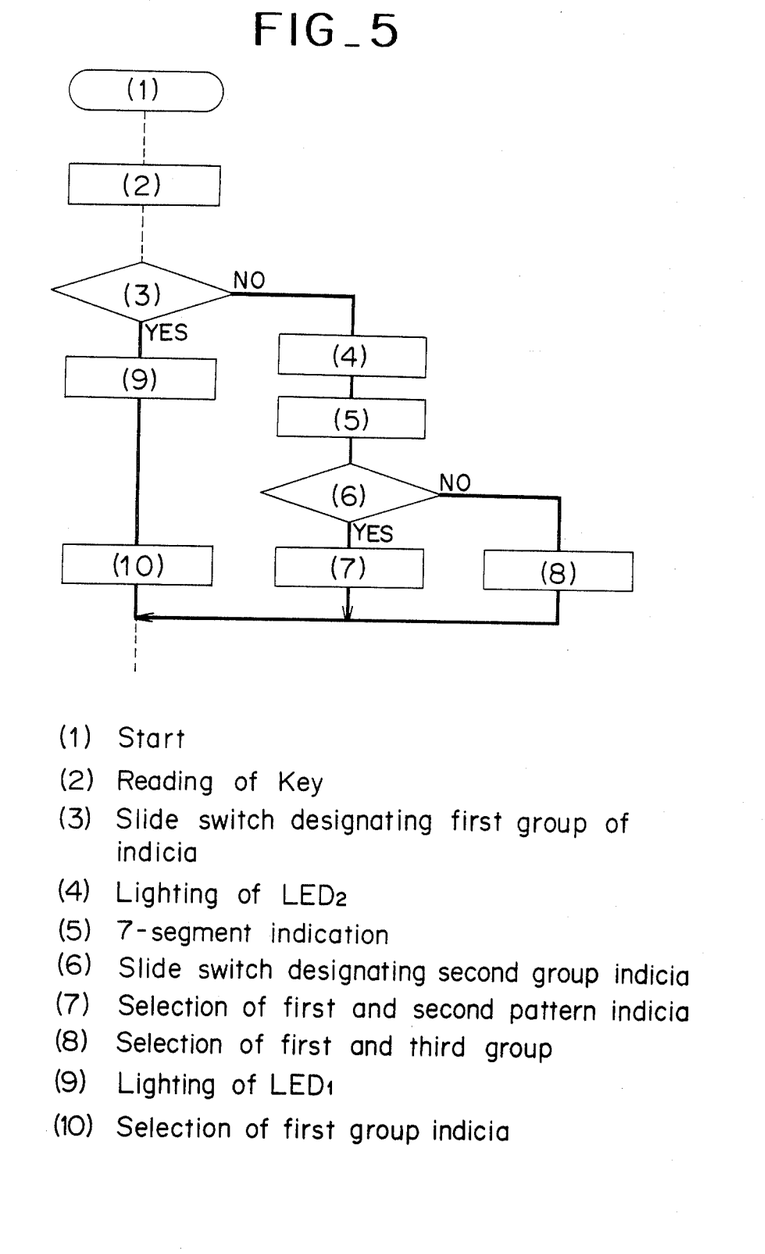
FIG. 5 is an explanatory flow chart of control performed by the control circuit.

The electric control operation is as follows; In reference to FIG. 5 showing a flow chart according to the invention, upon application of a control electric source, the microcomputer starts a program control. After the programs of initial setting or so have been carried out, reading of key is carried out, namely it is identified if the pattern selecting push button switches 4 and slide switch 7 have been operated. If the switch knob 51 of slide switch 7 is located at the center position, the actuators 30, 31 of switch elements 12, 13 are located at a lower position and produce a specific signal. With such a signal, it is identified that the first group of pattern indicia is designated, and the light emitting diode $LED_1$ is lighted at one of pattern indicia 5 in dependence upon the operation of push button switches 4. Thus a selected pattern indicium is electrically indicated. In this case, the pattern indicia are all hidden in the pattern indicating part 8 of the sewing machine. With the subsequent operation of sewing machine, the selected pattern is repeatedly produced with the stitches thereof controlled.

When the switch knob 51 of slide switch 7 is moved to the left or right side position, the actuator 30 or 31 of switch element 12 or 13 is at the upper position. In this case, the pattern selection is not limited to the first group of indicia 5, and the pattern numbers are electrically visible at the pattern number indicating part 9 by the light emitting diode $LED_2$. If a pattern number is designated by two—time operation of the push button switches 4, the two—figure number is indicated at the 7—segment indication tubes 10. If the switch knob 51 of slide switch 7 is at the left side position, the actuator 30 of switch element 12 is located at the upper position, and the actuator 31 of switch element 13 is located at the lower position. The resultant specific signal gives a function to the push button switches 4 to designate the pattern numbers of the second group of indicia (capital alphabet letters) as well as the first group of indicia 5. In this case, the capital alphabet letters and the accompanied numbers of second group of the indicia are visible in the pattern indicating part 8. Accordingly the two-time operation of push button switches 4 may selectively designate the pattern numbers of the second group of indicia and of first group of indicia 5. With the subsequent operation of sewing machine, a selected pattern is produced with the stitches thereof controlled.

When the switch knob 51 of slide switch 7 is at the right side position, the actuator 30 of switch element 12 is located at a lower position and the actuator 31 of switch element 13 is located at the upper position. The resultant specific signal gives a function to the push button switches 4 to designate the third group of indicia (small alphabet letters) in the pattern indicating part 8 as well as the first group of indicia 5. In this case, the third group of indicia and the accompanied numbers are visible, and two-time operation of the push button switches 4 may selectively designate any of pattern numbers of the third group of pattern indicia as well as the first group of pattern indicia 5. With the subsequent operation of sewing machine, a selected pattern is produced with the stitches controlled.

The numbers accompanying the pattern indicia respectively in the pattern indicating part 8 are determined in relation with the position of slide switch 7 (51), i.e., left or right side position thereof. It is therefore possible to give the same number to one of the indicia in the second group (capital alphabet letters) and to one of the indicia in the third group (small alphabet letters). The system of the invention is designed to select at most one hundred indicia including the ones in the first, second and third groups when the slide switch is located at the left or right side position.

FIGS. 6, 6(A) and 7(A), 7(B), 7(C) show a second embodiment of the invention. In this embodiment, the groups of indicia are switched to each other by a rotational dial instead of by a slide switch 7 (51) which is employed in the first embodiment. According to the embodiment, the dial is rotated to the maximum extent in the counterclockwise direction to visualize the second group of indicia in the pattern indicating part 8, so that the second group as well as the first group of indicia may be selected by operation of the push button switches 4. On the other hand, the dial is rotated to the maximum extent in clockwise direction to visualize the third group of indicia in the pattern indicating part 8, so that the second group as well as the first group of indicia may be selected. The dial is positioned at the center position to hide both groups of indicia in the pattern indicating part 8, so that only the first group of indicia may be selected by operation of the push button switches 4.

In reference to FIGS. 6, 6(A) and 7(A), 7(B), 7(C), the second embodiment will be explained only with respect to the parts which are different from the first embodiment as shown in FIGS. 1, 2 and 3(A) to 3(C). A pair of adjusting elements 59, 60 have bosses 61,62 respectively. The switch actuating elements 20, 21 are fitted to the bosses 61, 62 of the adjusting elements 59, 60 respectively, and are secured to each other by means of fastening screws. A panel 2A is formed with a mount 63 which has a pair of spaced pins 23A secured to the rear side thereof. On the pins 23A the adjusting elements 59, 60 are turnably mounted. The adjusting elements 59, 60 have transverse projections 66, 67 respectively which are protruded out to the front side of the panel 2A through arcuated slots 29A respectively which are formed in the mount 63. A rotary cam 68 is rotatably mounted on the mount 63. The rotary cam 68 is made of a synthetic resin and has a central mounting hole 69 as seen from FIG. 6(A). The rotary cam 68 is formed with an eccentric groove 70 of laterally symmetrical curvature as shown which is to cooperate with the transverse pins 66, 67. The rotary cam 68 is formed with an elastic projection 71 located radially thereof between the both ends of the eccentric groove 70. The projection 71 is adapted to snappingly engage three notches 72 formed on the rotary cam mount 63 respectively to position the rotary cam with respect to the mount 63.

Figures 6, 6A:
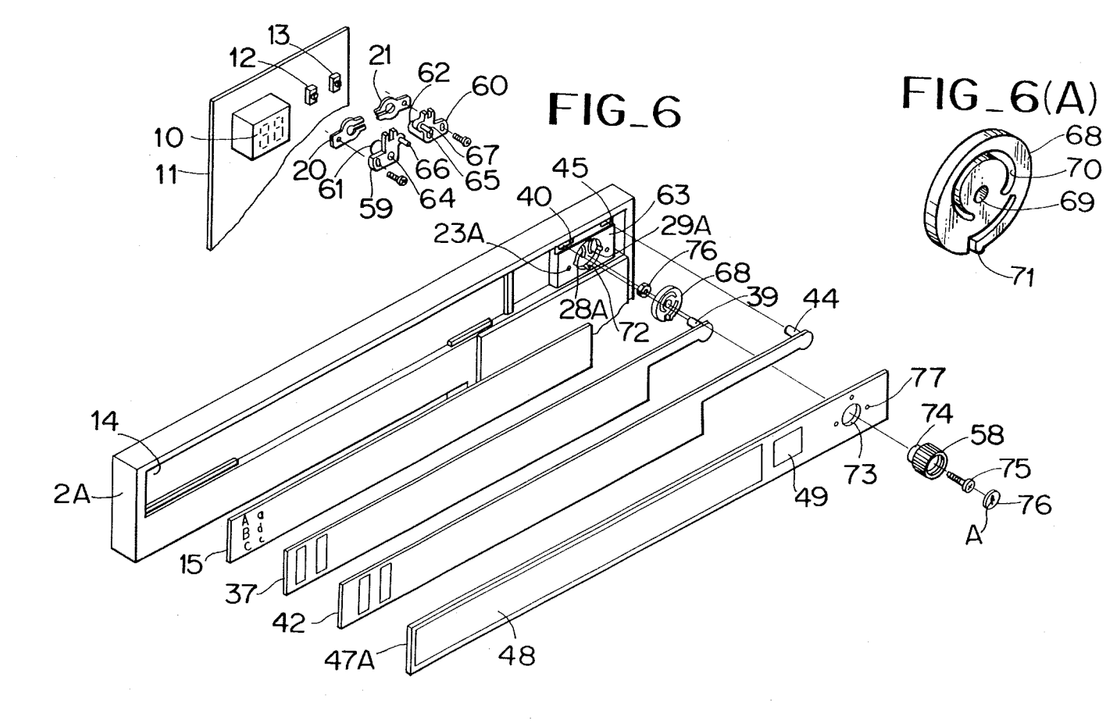
FIG. 6 is an exploded view of a second embodiment of the pattern selecting device shown with partly omitted details.
FIG. 6(A) is a perspective view of rotary cam which is one of the elements of the invention.

A window frame 47A has a dial guide hole 73 formed at the right end part thereof. A dial 58 is formed with an axial boss 74 which is to be inserted into the dial guide hole 73 and is then fixedly connected to the rotary cam 68 by means of a bolt 75 and a nut 76. The dial 58 is covered with a cap 76 which is affixed with an arrow mark A. The arrow mark A is related to three reference marks 77 provided on the window frame 47A to identify the three detaining positions of the dial 58 as the latter is rotated.

Figure 7A:
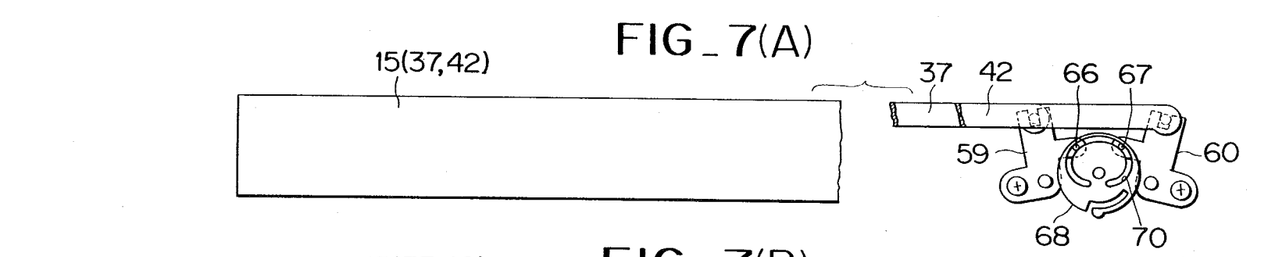
FIGS. 7(A) to 7(C) are explanatory operational views of the pattern selecting device according to the second embodiment of the invention.

The operation of the second embodiment is substantially the same with that of the first embodiment. It would therefore be not necessary to describe in detail the operation of the second embodiment. FIGS. 7(A) shows a condition in which the dial 58 is rotated until the arrow mark A is aligned with the center reference mark so that the first group of indicia may be selected.

Figures 7B, 7C:
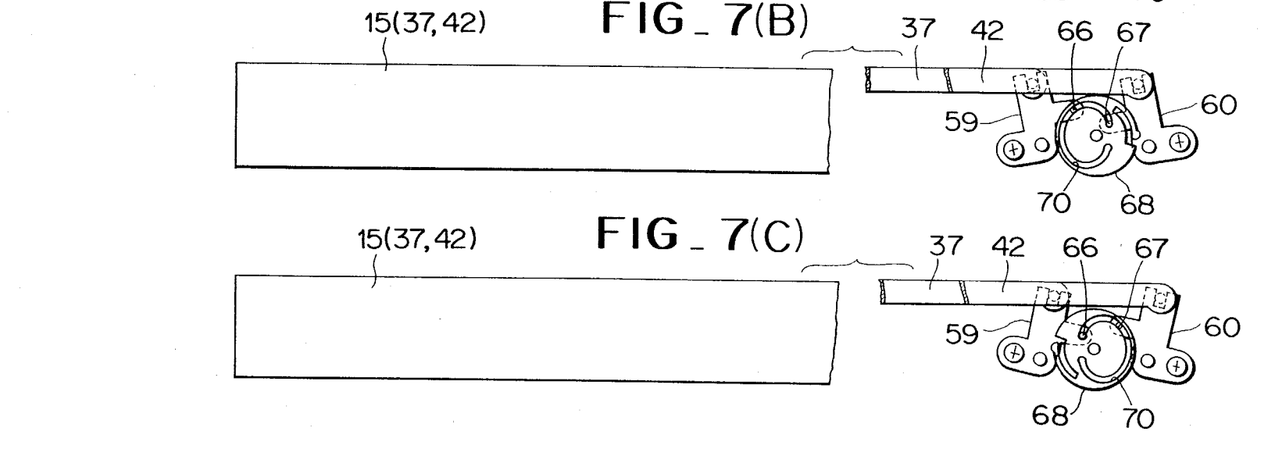

FIGS. 7(B) shows the condition in which the dial 58 is rotated in the counterclockwise direction until the arrow mark A is aligned with the left side reference mark so that the second as well as the first group of indicia may be selected. FIG. 7(C) shows a condition in which the dial is rotated in the clockwise direction until the arrow mark A is aligned with the right side reference mark so that the third as well as the first group of indicia may be selected.

It will be understood that each of the elements described above, or two or more together, may also find a useful application in other types of pattern selecting devices in electronic sewing machines differing from the types described above.

While the invention has been illustrated and described as embodied in a pattern selecting device for an electronic sewing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new as desired to be protected by Letters Patent is set forth in the appended claims.

What we claim is:

1. A pattern selecting device for an electronic sewing machine having a housing, a panel mounted on the housing for indicating a number of pattern indicia to be selected by the sewing machine operator, and an electronic memory storing a number of stitch control data for producing stitches in accordance with the pattern indicia, the pattern selecting device comprising a first section provided on the panel for usually indicating a first group of pattern indicia, a second section provided on the panel for indicating a second group of pattern indicia and a third group of pattern indicia; screening means mounted on the second section and movable relative to the second and third groups of indicia in the second section so as to selectively hide one of the second and third groups of indicia and visualize the other of the second and third groups of indicia, said screening means being also movable relative to the second and third groups of indicia so as to hide both the second and third groups of indicia; switching means operated to move the screening means relative to the second and third groups of indicia, said switching means producing a first electric signal when the screening means hides one of the second and third groups of indicia and visualizes the other of the second and third groups of indicia and a second electric signal when the screening means hides both the second and third groups of indicia; pattern selecting means including a plurality of switches which may be given different functions for selecting the indicia in the first, second and third groups in dependence upon the position of the screening means relative to the second and third groups of indicia; control circuit means receiving the first electric signal to give the pattern selecting switches a ten-key function so that the pattern selecting switches may be operated to select any of the indicia in the first, second and third groups, said control circuit means being actuated in accordance with operation of the switches of the pattern selecting means to select switch control data stored in the memory for producing the stitches of a selected pattern, said control circuit means receiving the second electric signal to give to the switches of the pattern selecting means a function exclusively for selecting the indicia of the first group by selecting operation thereof, said control circuit means being actuated in accordance with selective operation of the switches of the pattern selecting means to select stitch control data stored in the memory for producing the stitches of a selected pattern; and means for indicating by electric light a pattern number correspoding to a pattern selected by operation of the pattern selecting switches with the ten-key function.

2. The device as defined in claim 1, wherein said screening means includes a first slide plate mounted over said second section and a second slide plate arranged over said first slide plate.

3. The device as defined in claim 2, wherein said first slide plate and said second slide plate each is provided with transparent parts for visualizing the respective indicia in said second and third groups of indicia.

4. The device as defined in claim 3, wherein said switching means include a movable switch knob on said panel, a cam plate cooperating with said switch knob, and adjusting elements operatively connected to said cam and said first slide plate and said second slide plate to move the latter upon the movement of said switch knob by the sewing machine operator.

* * * * *